United States Patent [19]

Werderitch et al.

[11] 4,387,064

[45] Jun. 7, 1983

[54] METHOD AND APPARATUS FOR SORTING DEFECTIVE PARTS

[76] Inventors: Frank J. Werderitch, 120 Tamworth Pl., Schaumburg, Ill. 60172; Frank A. Eltvedt, 5 Lake Dr., Lake In The Hills, Ill. 60102

[21] Appl. No.: 289,494

[22] Filed: Aug. 3, 1981

[51] Int. Cl.³ .................... B07C 5/02; B07C 5/36; B29F 1/14
[52] U.S. Cl. .................... 264/40.1; 209/509; 209/552; 209/657; 264/40.5; 264/378.9; 425/149; 425/542
[58] Field of Search ............ 264/40.1, 40.3, 40.5, 264/328.9; 425/149, 542; 209/509, 523, 551, 552, 657

[56] References Cited

U.S. PATENT DOCUMENTS

| | | | |
|---|---|---|---|
| 3,628,901 | 12/1971 | Paulson | 425/149 |
| 3,767,339 | 10/1973 | Hunkar | 425/149 X |
| 3,807,914 | 4/1974 | Paulson et al. | 425/149 X |
| 3,840,312 | 10/1974 | Paulson et al. | 425/149 |
| 3,860,801 | 1/1975 | Hunkar | 425/149 X |
| 3,893,792 | 7/1975 | Laczko | 425/149 |
| 3,920,367 | 11/1975 | Ma et al. | 425/149 |
| 3,982,865 | 9/1976 | Adams et al. | 425/149 |
| 4,104,343 | 8/1978 | Cornelius | 264/40.1 |
| 4,171,262 | 10/1979 | Lattmann et al. | 209/657 X |
| 4,253,811 | 3/1981 | Hinzpeter et al. | 425/149 |
| 4,285,649 | 8/1981 | Jonte et al. | 264/40.1 X |

Primary Examiner—Philip E. Anderson
Attorney, Agent, or Firm—Edmond T. Patnaude

[57] ABSTRACT

Peak pressure in a mold is sensed and if it is outside a predetermined range the part or parts being molded are separated from parts produced while the peak pressure is within the predetermined range.

8 Claims, 8 Drawing Figures

METHOD AND APPARATUS FOR SORTING DEFECTIVE PARTS

The present invention relates in general to the art of automatically separating defective parts from acceptable parts produced by an automatic parts production machine, and it relates in particular to a parts sorter which responds to one or more operating values within the machine to anticipate the production of defective parts and to separate those parts from the other parts being produced.

BACKGROUND OF THE INVENTION

Molding machines such as those used in the production of injected molded plastic parts and those used in the production of die-cast metal parts will intermittently produce parts which do not meet acceptable standards and are, therefore, defective. These defective parts must be separated from the acceptable parts, and this is commonly carried out in a manual inspection operation. Preferably, the parts are inspected as they leave the machine so that the production of an inordinate number of defective parts will be promptly detected and the machine shut down for correction of the problem. However, for reasons of economy, space and for other reasons, it is ordinarily not possible to carry out the inspection at this time, and the parts are usually collected in an unsorted condition in a single bin or other receptacle for hand sorting at a later time.

It would be desirable, therefore, to provide a parts sorter which would automatically separate any defective parts from the acceptable parts as they are ejected from the machine. Moreover, where the parts are molded it would be advantageous if the defective parts were further sorted into at least two categories, those in which the parts are incomplete and those in which the parts include an excessive amount of flashing. The incomplete parts result from an insufficient amount of plastic in the mold cavity. By observing the defective parts, the machine operator will be alerted to both the numbers and types of defective parts being produced, and in many cases, the operator can promptly take whatever corrective action is required. Also, by separating the two types of defective parts, the defective parts with the excessive flashing can in many cases be manually trimmed and thus saved.

SUMMARY OF THE INVENTION

Briefly, in accordance with the broader aspects of the present invention, there is provided a device which is responsive to one or more variable operating conditions in a parts production machine to anticipate the production of defective parts and to automatically separate such defective parts from the normally produced acceptable parts. In one embodiment of the invention, the peak pressure in an injection mold cavity is sensed during each molding cycle, and if that peak pressure is above or below a predetermined pressure range, the sorter automatically separates the parts produced during that machine cycle from the acceptable parts produced in other machine cycles. In a preferred embodiment of the invention, the defective parts are further sorted according to whether the peak pressure in the mold cavity was above or below the predetermined pressure range while the parts were being produced.

In order to improve the efficiency of operation of a parts production machine, there is provided in accordance with another aspect of the invention a counter which counts the number of defective parts produced. If the number of defective parts produced during a predetermined time period or during a predetermined number of machine cycles, exceeds a given number a signal is produced, which signal may be used to shut down the machine, to activate an alarm, or to perform other useful function.

GENERAL DESCRIPTION OF THE DRAWINGS

The present invention will be better understood by a reading of the following detailed description taken in connection with the accompanying drawings wherein.

DETAILED DESCRIPTION OF THE INVENTION

Figure 1:
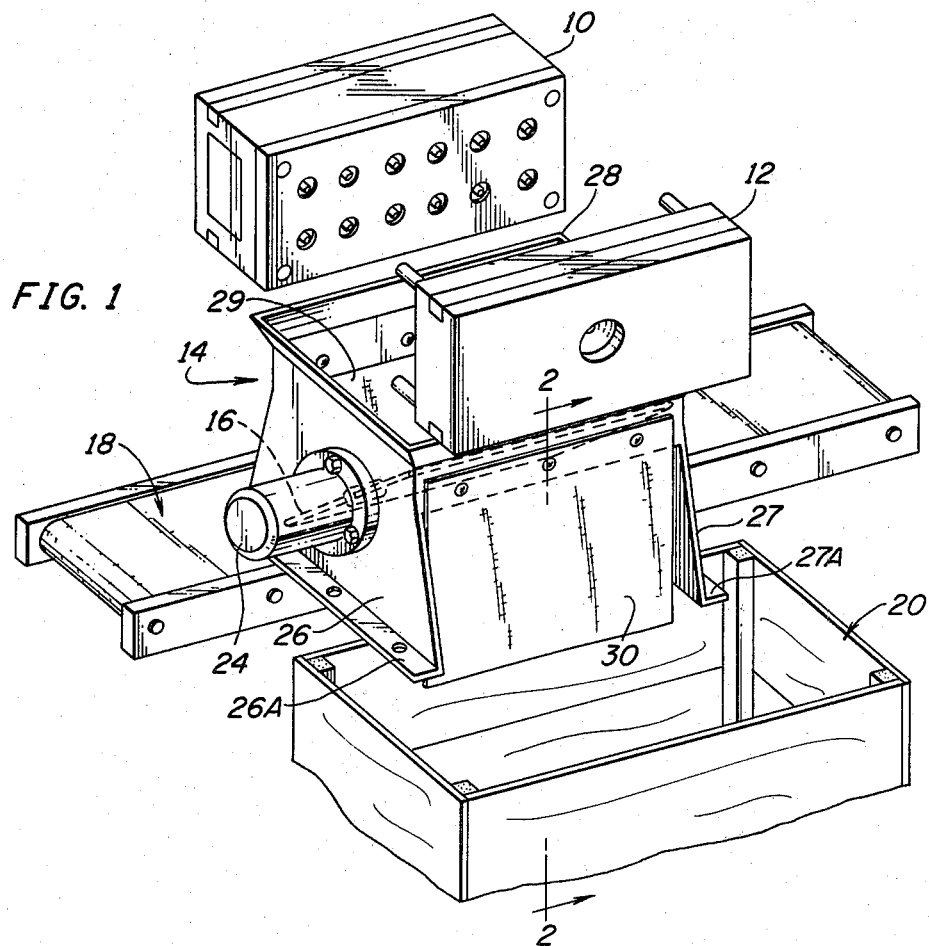
FIG. 1 is a perspective view of a defective parts sorter embodying the present invention in use with a molding machine.
Figure 2:
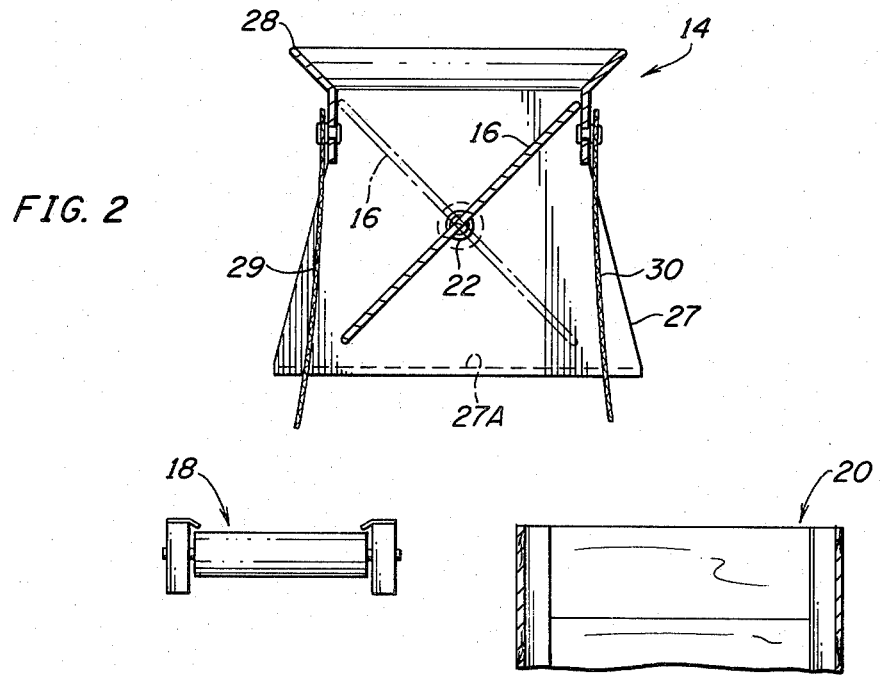
FIG. 2 is an elevational cross-sectional view of the parts sorter of FIG. 1 taken along the line 2—2 thereof.

Referring to FIGS. 1 and 2, there is shown a pair of twelve cavity molds 10 and 12 constituting a portion of an injection molding machine. The mold parts 10 and 12 are mounted to horizontally movable platens and are shown in the spaced apart, open positions at the completion of a molding cycle, the molded parts having been ejected from the mold cavities. When the molds open, the freshly molded parts are ejected from the mold cavities and fall under the force of gravity into a defective parts sorter 14 mounted directly below the molds.

The parts sorter 14 includes a pivotally mounted deflector plate 16 which deflects the acceptable parts rearwardly onto a continuously traveling conveyor belt 18 and deflects the defective parts forwardly into a suitable receptacle 20. It will be understood that if desired, the conveyor 18 may be replaced by a suitable, fixed container, and the receptacle 20 may be replaced by a conveyor. The deflector plate 16 is mounted to a shaft 22 extending from the rotor of a rotary solenoid 24. As more fully described hereinafter, the solenoid responds to a control signal to position the deflector plate 16 either in the "accept" position shown in FIG. 1 for acceptable parts or in the "reject" position shown in phantom in FIG. 2 for defective parts. The control signal is obtained from a suitable controller which senses certain operating conditions in the molding machine to anticipate the production of acceptable or defective parts in each molding cycle. We have determined that for many applications the peak pressure and/or peak temperature in the mold during the molding cycle indicates whether the parts then being molded will be acceptable or not. If the peak pressure or temperature is above or below a predetermined range, the parts being produced will be defective, wherefore a control signal is generated which causes the solenoid 24 to rotate the deflector plate 16 to the defective parts or "reject" position. Consequently, when the molds subsequently open, the ejected parts are deflected into the "reject" receptacle 20.

The frame of the sorter 14 comprises a pair of end walls 26 and 27 having external mounting flanges 26A and 27A at the bottom and an outwardly flared top frame 28 defining a rectangular opening into which the freshly molded parts fall. A pair of flexible skirts 29 and 30, which are preferably formed of a plastic coated fabric cloth, are suspended over the front and rear open sides of the sorter 14 to prevent the falling parts from bouncing away from the sorter rather than falling down to the desired locations, i.e., conveyor 18 or receptacle 20.

In FIGS. 3, 5, 6 and 8 electromagnetic solenoids are identified by the letter R followed by a number identifying the particular relay or other device. Hence R1 identifies the solenoid of a relay R1. The sets of contacts of the relays are identified by the letter C followed by the number of the associated relay and solenoid. For example, one contact set of the relay R1 is identified as C1. Additional contact sets of the relay R1 would be identified as C1A,C1B etc.

Figure 3:
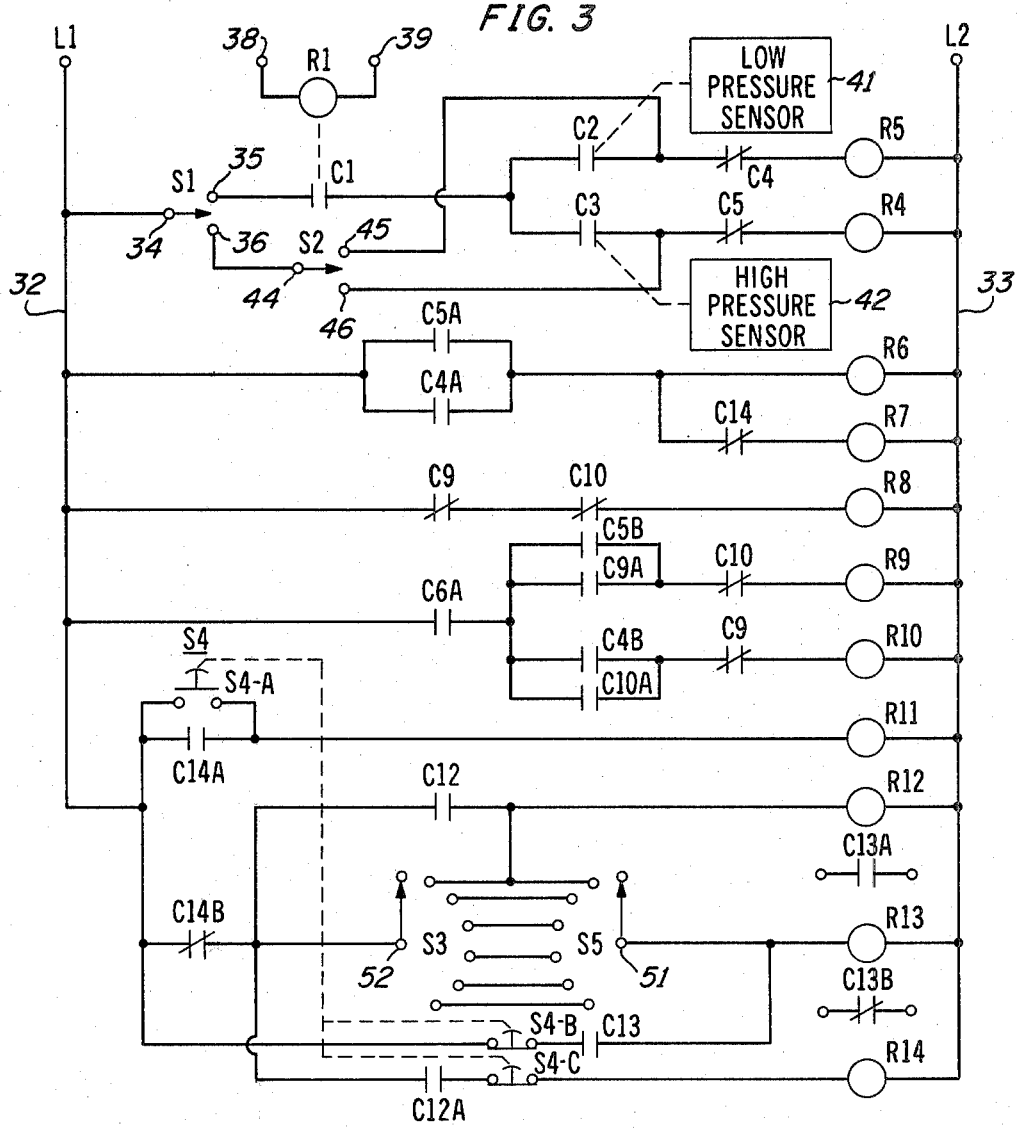
FIG. 3 is a schematic diagram of a control circuit usable with the parts sorter of FIGS. 1 and 2 and with other sorting mechanisms.

Referring to FIG. 3, there is shown a parts sorter control circuit for developing a control signal which may be used to operate the rotary solenoid 24. It will be understood, however, that the control signals generated by the circuit of FIG. 3 can be used with other types of parts sorters and the circuitry itself could be replaced with other control circuits using, for example, solid state integrated circuit components. The circuit of FIG. 3 comprises a pair of power input terminals L1 and L2 adapted to be connected to a source of electrical power such, for example, as a power line or the output terminals of a d.c. power supply. The terminal L1 is connected to a bus 32 and the terminal L2 is connected to a bus 33. The bus 32 is connected to the common terminal 34 of a selector switch S1 also having terminals 35 and 36. The switch S1 is used to set the circuit in an automatic mode or in a manual test Mode. With the wiper of switch S1 in the up position, that being the automatic position, power is coupled from bus 32 via the switch terminal 35 to a set of normally open contacts C1 of a machine cycle relay R1 having its solenoid connected between a pair of input terminals 38 and 39. The terminals 38 and 39 are connected to the associated molding machine to tap off current therefrom only when the molds are closed. Therefore, only when the molds are closed is the relay R1 picked up wherefor the relay R1 picks up and drops out once during each complete cycle of the molding machine. It may thus be seen that during the mold cycle when the molds are closed, the contacts C1 are closed thereby to couple power to two sets of normally open contacts C2 and C3. The contacts C2 are closed if the operating variable in the machine being sensed, such as pressure in the mold, is below a predetermined range, and the contacts C3 are closed if the operating variable being sensed is above the predetermined range. As shown, the contacts C2 are controlled by a low pressure sensor 41 and the contacts C3 are controlled by a high pressure sensor 42. Preferably the sensors 41 and 42 are adjustable and can respond to other variable such, for example, as temperature within the mold cavity. If neither set of contacts C2 or C3 are closed, i.e., the sensed variable is neither above nor below the acceptable range, the sensed variable is within acceptable limits wherefor acceptable parts should be produced.

It may be seen that the contacts C2 are serially connected with a set of normally closed contacts C4 of a high pressure relay R4 and the solenoid of a low pressure relay R5. Similarly, contacts C3 are serially connected with a set of normally closed contacts C5 of the low pressure relay R5 and the solenoid of the high pressure relay R5. In order to selectively bypass the contacts C2 and C3 to actuate either of the relays R4 and R5, for purposes of testing or calibration, the selector switch S1 may be thrown to the down position, called manual, which connects the power bus 32 to the common terminal 44 of a selector switch S2 having one switching terminal 45 connected to the junction between the contacts C2 and C4 and another switching terminal 46 connected to the junction between the contacts C3 and C5. As explained more fully hereinafter, energizing of either or both of the relays R4 and R5 produces a control signal which may be used to operate the sorter 14 to cause the molded parts to be directed away from the acceptable parts conveyor.

When either of the relays R4, R5 is picked up, a time delay circuit is energized. To this end a set of normally open contacts C5A of the relay R5 and a set of normally open contacts C4A of the relay R4 are connected in parallel with one another and in series with the solenoid of a time delay relay R6 between the power busses 32 and 33. The contacts C4A and C5A are also connected in series with a set of normally closed contacts C14 of a second time delay relay R14 and the stepping solenoid R7 of a reject stepping switch S3. The time delay relay R14 is of the type which picks up after a predetermined time delay following energizing of its pickup coil or solenoid. Therefore, unless either of the relays R4 or R5 is picked up the relay R6 remains dropped out and the wiper of the switch S3 cannot step. However, the switch S3 is stepped once for each machine cycle in which defective parts are produced.

The solenoid of a power relay R8 is connected in series with a set of normally closed contacts C9 of a power relay R9 and a set of normally closed contacts C10 of a power relay R10. As described hereinafter in connection with FIG. 5, the relay R8 can be used to control the direction of rotation of a reversible motor so that the motor rotates in one direction when the relay is picked up and in the opposite direction when the relay is dropped out. Of course, the relay R8 can also be used to control the position of the deflector 16 of FIGS. 1 and 2.

As shown, the power bus 32 is connected to a set of normally open contacts C6A of the relay R6 which as described above is picked up only when either the under pressure or over pressure relays R4, R5 are picked up. Consequently, the relays R9 and R10 whose solenoids are serially connected with the contacts C6A remain dropped out wherefor relay R8 is picked up whenever acceptable parts are being produced and is dropped out when conditions are such that the production of defective parts is anticipated.

Connected in series between the solenoid of the relay R9 and the contacts C6A is a set of normally closed contacts C10 of power relay R10 and the parallel connection of normally open contact sets C5B and C9A. Connected between the solenoid of relay R10 and contacts C6A is a set of normally closed contacts C9 of the relay R9 and the parallel connection of normally open contact sets C4B of relay R4 and C10A of relay R10.

The reset coil R11 for the stepping switch S3 is serially connected with a set of normally open contacts C14A of the time delay relay R14. A set of normally open contacts S4A of a push button type switch S4 are connected in parallel with the contacts C14A and are used to momentarily energize the reset coil R11 of the switch S3.

The solenoid of a time count latch relay R12 is serially connected between the power busses L1 and L2 with a set of normally open holding contacts C12 of the relay R12 and a set of normally closed contacts C14B of the time delay relay R14. The solenoid of a power relay R13 is connected between the bus 33 and the wiper terminal 51 of a rotary selector switch S5. The contacts C14B are connected between the bus 32 and the wiper terminal 52 of the rotary stepping switch S3. As shown, the upper contacts of the switches S3 and S5 are open contacts and corresponding ones of the remaining contacts are respectively connected together. The second contacts only are connected to the junction between the contacts C12 and the solenoid of the time count latch relay R12. Hence, the relay R12 picks up when the first "reject" machine cycle occurs.

A set of normally closed contacts S4-B of the switch S4 is connected in series with a set of normally open holding contacts C13 of the relay R13 between the power bus 32 and the solenoid of the power relay R13. A set of normally open contacts C12A of the relay R12 and a set of normally closed contacts S4-C of the switch S4 are serially connected between the contacts C14B and the solenoid of the time delay relay R14. The switch S4 includes the three sets of contacts S4-A; S4-B; and S4-C and three contact blades which are ganged together for simultaneous actuation by a spring-loaded push button. The relay R13 includes a set of normally open contacts C13A which may be connected in series with an alarm device (not shown) and a set of normally closed contacts C13B which may be connected in the power circuit to the associated molding machine. Therefore when relay R13 picks up it may sound an alarm via contacts C13A and deenergize the molding machine via contacts C13B.

OPERATION OF FIG. 3

Assume the switch S1 to be in the "automatic" up position with the terminal 35 connected to power bus 32. As a molding cycle begins the mold closing solenoid (not shown) is energized to move the molds into the closed, mutually engaging, position. The relay R1 is picked up at this time to close contacts C1. At this moment the pressure in each of the mold cavities is at ambient and the mold pressure indicator on the molding machine will read zero. As the molten plastic enters the mold both the pressure and temperature within the mold begin to increase. In a conventional mold cycle the molten plastic continues to enter the mold until the fill cycle is completed and the hold cycle of the machine commences. During the hold cycle the molds remain closed for a sufficient time to permit the plastic to set up or solidify in the mold cavities. During the hold cycle the pressure or temperature in the mold can be measured and the readings used to close contacts C2 or C3 and actuate one or the other of the relays R4, R5 if the sensed values are above or below the acceptable range. When the variable such as pressure or temperature being sensed is below the acceptable range the mold cavities will ordinarily be only partially filled and a defective part will result. When the pressure or temperature are above the acceptable range some of the molten plastic will generally have been forced between the molds to provide an excessive flash at the parting line between the molds.

Although the circuit of FIG. 3 is designed for performing several control functions, sets of normally open contacts of the relays R4 and R5 can be connected in series parallel relationship with the rotary solenoid 24 of FIG. 1 to rotate the deflector 16 to the defective parts position as shown in phantom in FIG. 2 when either of the relays R4, R5 is picked up. When so used, if the relays R4 and R5 are both dropped out the solenoid 24 is deenergized and the deflector 16 may be spring biased to the acceptable parts position.

The circuit of FIG. 3 can also be used to control the operation of a defective parts sorter of the type shown, for example, in FIG. 4 wherein a conveyor belt 53 located below a set of molds 54 and 55 is driven to the left when acceptable parts are produced and to the right when defective parts are produced. Hence, acceptable parts are dropped from the left side of the conveyor as viewed in FIG. 5. For this purpose the circuit of FIG. 3 includes the relay R8 which is picked up at all times except when defective parts are being produced causing either Relay R4 and R5 to be picked up. The manner in which the relay R8 can be used to control the direction of movement of the conveyor 53 is more fully described hereinafter in connection with FIG. 5. The remainder of the circuit is provided to generate a control signal when more than a preset number of defective parts are produced during a predetermined period. The time delay relay R14 is set to the time required for the molding machine to go through a desired number of cycles, say one-hundred. For example, if each cycle is one-half second long, and it is desired to generate the control signal when four defective cycles per one-hundred machine cycles occurs, the relay R14 may be set to fifty seconds and the wiper of the selector switch S5 set to the fourth contact from the zero position, which position is shown in phantom in FIG. 3. When, therefore, the relays R4, R5 have picked up four times before the time delay relay R14 has timed out to open contacts C14B, the relay R13 will be energized via the switches S3 and S5 and the normally closed contacts C14B.

Assuming that the machine has been producing acceptable parts for at least fifty seconds, wherefore the time delay relay R14 is dropped out, and in the next machine cycle relay R4 is picked up. Contacts C4A thus close and relay R6 picks up. In addition, the stepping coil R7 of the switch S3 is energized to step the wiper to the first contact after the zero position thereby energizing the time count latch relay R12. Contacts C12A thus close to energize the time delay relay R14 and contacts C12 close to hold relay R12 picked up until contacts C14B open. Because the relay R14 was set to fifty seconds it will pick up fifty seconds thereafter if it remains energized throughout that entire time.

At the end of the machine cycle the molds open and the relay R1 drops out causing relay R4 to drop out because the contacts C1 open. Contacts C4A thus open to deenergize the stepping coil R7 of the defective parts counter switch S3. Also, contact C4A opens to drop out relay R6 causing the normally open contacts C6A to open to drop out relay R10. Contacts C10 thus close whereby relay R8 picks up to return the parts sorter to the acceptable condition.

When either of the sensors 41 or 42 next close its respective contacts C2 or C3, one of the relays R4, R5 picks up to repeat the above described operation. If the time delay relay R14 has timed out before the wiper of switch S3 has been stepped to the fourth position, i.e., the position corresponding to the position to which the wiper of selector switch S5 has been set, the relay R14 will pick up momentarily. When relay R14 does pick up, its holding contacts C14B will open to cause it to immediately drop out. Opening of the contacts C14B also causes the relay R12 to drop out. When contacts C14A close, the reset coil R11 is energized to reset switch S3.

If, on the other hand, four defective part cycles occur before the relay R14 has timed out, then the relay R13 will pick up to provide the requisite control signal. When the relay R13 has picked up, the operator is made aware of a problem. To reset the control circuit the operator must actuate the switch S4 thereby energizing the reset coil R11 of switch S3 via switch contacts S4A and deenergizing the time delay relay R14 via switch contacts S4C. Also opening of the switch contacts S4-B drops out relay R13.

Figure 4:
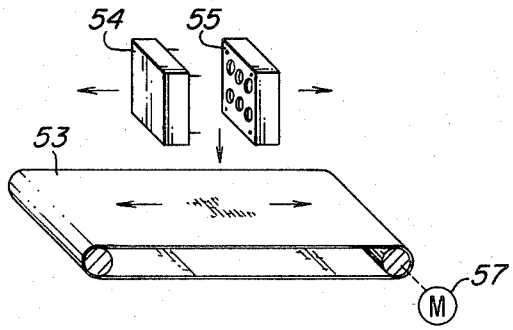
FIG. 4 is a perspective view illustrating another defective parts sorting mechanism embodying the invention.
Figure 5:
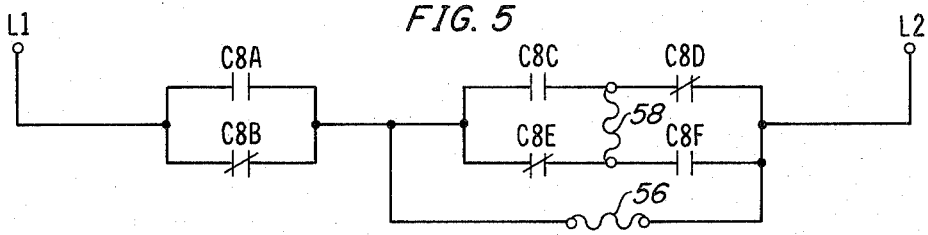
FIG. 5 is a schematic diagram of a control circuit for use with the parts sorter of FIG. 4.

As mentioned hereinbefore, the control circuit shown in FIG. 3 can be used to operate a reversible motor for driving the conveyor belt 53 of FIG. 4 in one direction or the other. In FIG. 5 there is shown a motor control circuit which may be used for that purpose.

As shown in FIG. 5, the run winding 56 of a motor 57 for driving the conveyor belt 53 is connected in series with the parallel circuit of normally open contacts C8A and C8B of the power relay R8 of FIG. 3 across the output terminals of a power source. A set of normally open contacts C8C and a set of normally closed contacts C8D are serially connected across the run winding 56, and a set of normally closed contacts C8E and a set of normally open contacts C8F of the relay R8 are also connected in series across the run winding 56. The start winding 58 of the belt drive motor 57 is connected between the junction of contact sets C8C and C8D and the junction of contact sets C8E and C8F. It may thus be seen that current flows in one direction through the start winding 58 when the relay R8 is dropped out and flows in the other direction through the start winding 58 when the relay R8 is picked up. The direction of starting current through the start winding 58 determines the direction of rotation of the rotor of the motor which thus drives the conveyor belt in one direction when defective parts are being produced and in the other direction when acceptable parts are being produced.

As noted above, the time delay relay R6 picks up immediately when energized, but when deenergized it remains picked up for a predetermined time. Consequently, the relay R8 remains dropped out for this predetermined time delay period after relay R6 is deenergized, i.e., after the molds open and the molded parts are ejected from the molds, to maintain the motor 57 energized for a sufficient time to carry the molded parts off the end of the belt 53.

Figure 7:
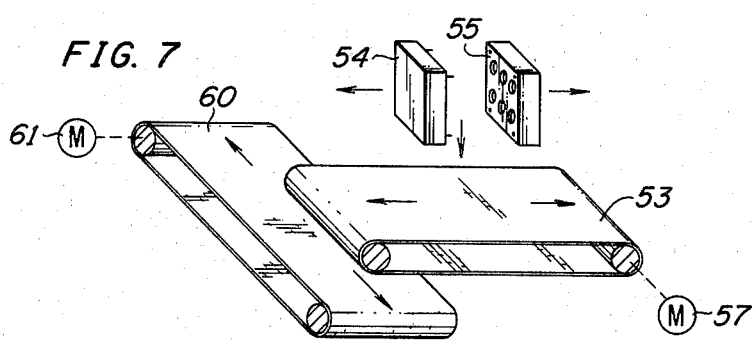
FIG. 7 is a perspective view of still another parts sorter mechanism embodying the invention.

Referring to FIG. 7 there is shown a defective parts sorter which further sorts the defective parts into first and second groups, the first group being those produced when the pressure or other variable was high, and the second group being produced when the pressure or other variable was low. This sorter includes the conveyor belt 53 of FIG. 4 and its associated reversible drive motor 57 and control circuit of FIG. 5. In addition, however, it uses a second conveyor belt 60 located below the end of belt 53 from which the defective parts are dropped. The belt 60 is driven by a reversible motor 61 which drives the belt 60 in one direction when sensor 41 closes contacts C2 and in the opposite direction when sensor 42 closes contacts C3.

Figure 8:
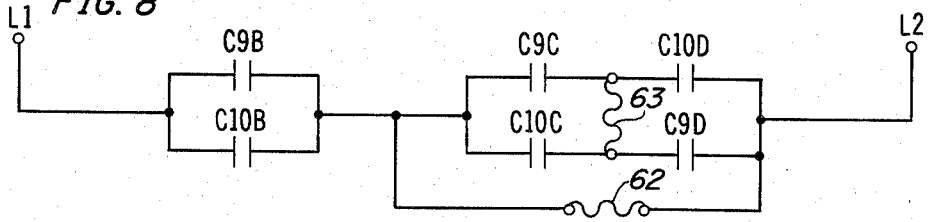
FIG. 8 is a schematic diagram of a control circuit for use with the parts sorter of FIG. 7.

In FIG. 8 there is illustrated the control circuit which controls the operation of the motor 61 which drives the defective parts belt 60 so as to drive it in one direction when the contacts C2 close and in the opposite direction when the contacts C3 close. As shown, a set of normally open contacts C9B of relay R9 and a set of normally open contacts C10B of relay R10 are connected in parallel and in series with the run winding 62 of the reversible belt drive motor 61 across a power source so that when either relay R9 or R10 is picked up the run winding 62 is energized. The start winding 63 of the same drive motor is connected in series with two sets of normally open contacts C9C and C9D across the run winding 62 so that the current flows down through the winding 63 (as shown) when relay R9 is picked up. It may thus be seen that acceptable parts will be dropped off the right hand end of the conveyor belt 53 while defective parts will be dropped off the left hand end of the conveyor belt 53 and onto the belt 60. If the defective parts resulted from an under pressure condition they will drop off one end of belt 60 and if they resulted from an over pressure condition they will drop off the other end of belt 60. It will be understood that this same system of sorting can be used to further sort the defective parts dropping from the ends of the conveyor belt 60.

The control circuit of FIG. 3 may be used with a controller of the type which produces a first and second output signal when the peak value of a variable such as mold temperature or mold pressure during the mold cycle is less than or more than predetermined minimum and maximum values. One such controller is manufactured and sold by Barber Coleman Company of Rockford, Ill. under Model 916 Pressure Transfer Controller. However, the circuit finds application with any other suitable means for closing the contacts C2, C3 in response to under and over operating conditions in a parts production machine.

Figure 6:
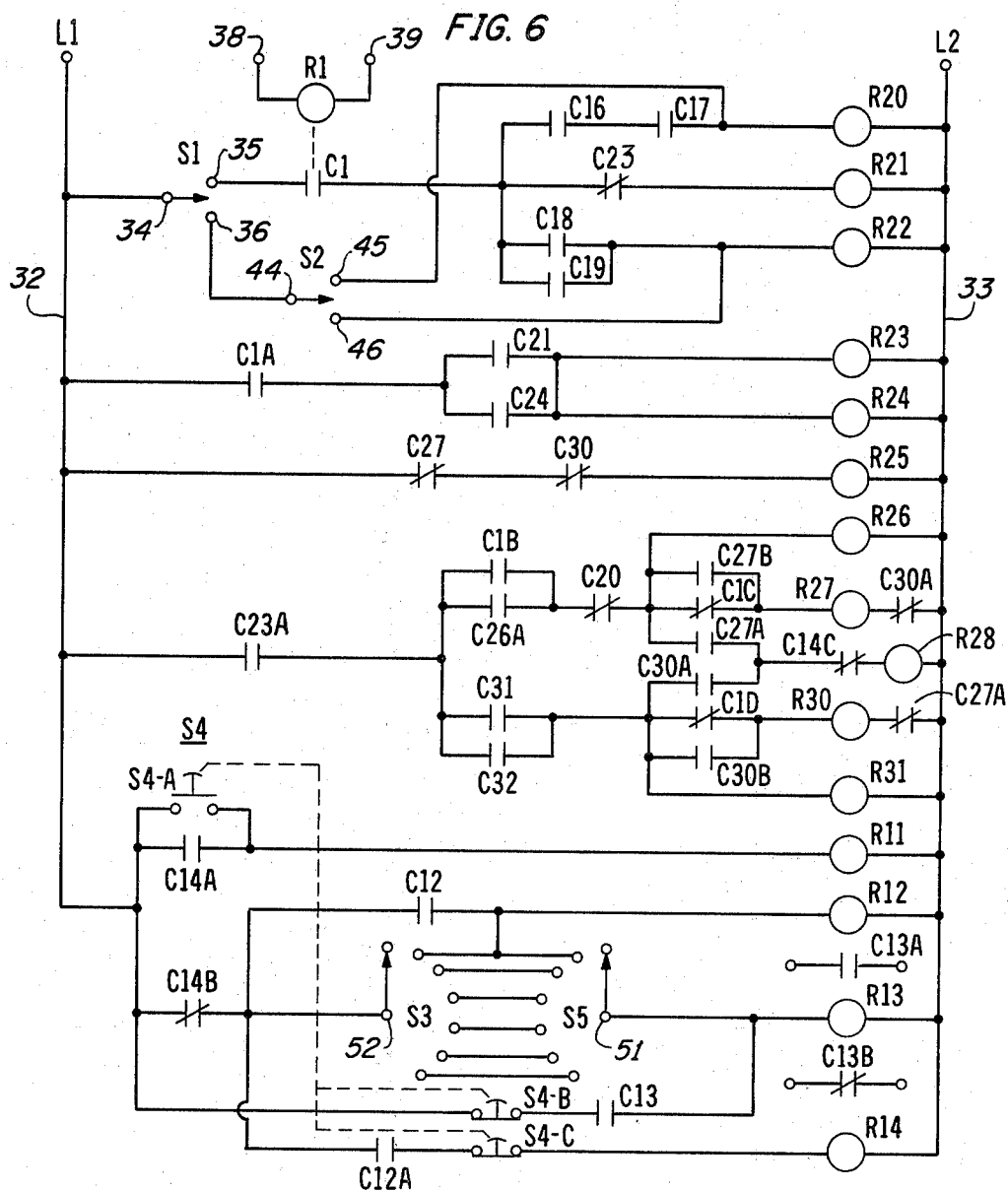
FIG. 6 is a schematic diagram of another control circuit usable with the parts sorter of FIGS. 1 and 2.

In order to separate defective parts from acceptable parts in response to discrete signals from separate pressure, temperature or other variable measuring devices, the embodiment of the invention illustrated schematically in FIG. 6 may be used. The circuit of FIG. 6 is similar in many respects to that of FIG. 3 and like parts are identified by like reference numerals.

As shown in FIG. 6, the solenoid of relay R20 is connected in series with a pair of normally open contact sets C16 and C17. Contacts C16 are closed by a suitable pressure transducer when the mold pressure is greater than a predetermined minimum pressure value for acceptable parts. Contacts C17 may be part of a suitable thermostat which closes the contacts C17 when the mold temperature is greater than a predetermined minimum low temperature value for acceptable parts. Therefore, with the mold closed and contacts C1 closed, relay R20 picks up when the temperature and pressure in the mold increase to the predetermined, minimum acceptable values. The solenoid of relay R22 is serially connected with the parallel connection of two sets of normally open contacts C18 and C19. Contacts C18 are closed by a suitable pressure transducer when the mold pressure exceeds a predetermined high pressure value above which defective parts may be produced, and contacts C19 are closed by a suitable temperature sensing device when the mold temperature exceeds a predetermined high temperature value above which defective parts may be produced. It may be seen that relay R22 will be picked up if either the mold temperature or mold pressure exceeds its corresponding high value which would cause the production of defective parts. Preferably, the temperature pressure values at which the contacts C16, C17, C18 and C19 close are adjustable by the machine operator.

If the machine variables being monitored, such as mold temperature and pressure, are within acceptable limits during the molding cycle, the solenoid of a power relay R25 is energized through the normally closed contacts C27 and C30 of relays R27 and R30. Suitable contacts (not shown) on relay R25 may then be used to cause the sorter to be in the acceptable parts condition.

Relay R20 is picked up via contacts C16 and C17 when both the pressure and temperature reach the minimum acceptable values. Also, the solenoid of relay R21 is energized through contacts C23 to close contacts C21. The contacts C21 are serially connected with contacts C1A and the solenoid of a time delay relay R23 which has a time delay on deenergization, i.e., when deenergized, the relay does not immediately drop out. It may be seen that the solenoid of a relay R24 is connected in parallel with the solenoid of relay R23. Inasmuch as the relay R22 remains dropped out because of the fact that the mold pressure and mold temperature did not exceed the acceptable minimum values, nothing further occurs.

Assume, however, that either the mold pressure or mold temperature remains below the acceptable limit during the mold cycle while the molds are closed and relay R1 is thus picked up. Relay R21 still picks up as do relays R23 and R24. In addition, relay R26 picks up since its solenoid is serially connected across the power supply with normally open contacts C23A of relay R23, normally open contacts C1B of relay R1, normally closed contacts C1B of relay R1, and normally closed contacts C20 of relay R20, which is dropped out. It may be seen that the solenoid of relay R27 is not energized at this time but is energized through normally closed contacts C1C of relay R1 when the molds open, and normally closed contacts C30A of relay R30 which is not picked up because relay R22 has not picked up to close normally open contacts C22.

When relay R27 picks up, its normally closed contacts C27 connected in series with the solenoid of relay R25 open to cause relay R25 to drop out. As described above, relay R25 controls the sorter and when relay R25 is dropped out the sorter is in a defective part or reject mode of operation.

When relay R27 picks up, its contacts C27A close to energize the stepping coil R28 of stepping switch S3 causing its wiper to step one contact position. Assuming this is the first time switch S3 has stepped since it was last reset, relay R12 is picked up via the first contact position of switch S3 and normally closed contacts C14B of time delay relay R14. Contacts C12A of relay R12 thus close and energize the coil of time delay relay R14. As described above, relay R14 does not immediately pick up but remains dropped out for a preset time after being initially energized. At the end of that time delay period, relay R14 will pick up causing its contacts C14A to close and energize the reset coil R11 of the switch S3. Moreover, contacts C14B will open to deenergize the coil of relay R14 which again drops out.

Assuming that the time delay relay R14 remains picked up and during a subsequent mold cycle the mold temperature and/or mold pressure exceed the maximum acceptable values whereby contacts C18 and/or C19 close causing relay R22 to pick up. Contacts C16 and C17 will, of course, be closed whereby relay R20 is also picked up. Relay R21 also picks up when the mold initially close and contacts C1 of relay R1 close. With relay R20 picked up, contacts C20 are open whereby relays R26 and R27 remain dropped out. However, relay R31 is picked up via contacts C23 and contacts C22. Relay R30 remains dropped out until the molds next open to drop out relay R1 and permit contacts C1D to close. When relay R30 picks up, its contacts C30 open to cause the relay R25 to drop out and thereby cause the sorter to operate in the reject or defective parts mode. Moreover, contacts C30A close to energize the stepping coil R28 of reject stepping switch S3.

It may be seen that relay R27 is actuated when the mold pressure or temperature are below acceptable limits and the relay R30 is actuated when the mold pressure and temperature are above acceptable limits. These relays can thus be used to control a second stage sorter such as the conveyor belt 60 of FIG. 7 causing it to travel in one direction when the relay R27 is picked up and in the other direction when the relay R30 is picked up. If desired, however, a second sorter of the type shown in FIG. 1 can replace the receptacle 20 to sort the defective parts into high and low pressure/temperature rejects.

It may be seen that in the control circuit of FIG. 6, a control cycle is initiated when the molds close and the relay R1 picks up. Thereafter, the temperature and/or pressure measurements are made. However, the reject relays which control the sorter mechanism are not dropped out until the relay R1 drops out as the molds begin to open. At that time the reject relays are enabled, and if a reject condition did occur during the mold cycle the power relay drops out thereby causing the sorter to operate in the reject condition. In this manner, hunting is prevented as the temperature and pressure in the mold increase during the mold cycle. Moreover, the time delay between the deenergization of the solenoid of relay R23 when contacts C1A open and the opening of contacts C23A is set for a sufficient time so that the reject sorter remains in the reject position to transfer all of the defective parts away from the acceptable parts. For example, the belt 53 in FIG. 4 is driven in the reject direction for a sufficient time to carry the defective parts off the end of the belt.

While the circuits of FIGS. 3 and 6 may be used with various sorter mechanisms such as those shown in FIGS. 1, 4 and 7 it will be understood that other devices for diverting parts to a reject location may be used. For example, an airstream may be directed across the path of parts exiting the mold only when defective parts have been produced thereby to divert the defective parts away from the normal trajectory. Similarly, a suction device may be used for the same purpose. However, irrespective of the particular sorting mechanism which is used, the system of the present invention senses one ore more variable conditions in a parts production machine to separate defective parts from acceptable parts as they leave the machine.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A method of sorting acceptable parts from defective parts produced by a parts producing machine having at least one operating variable whose value is determinative of the acceptability of the parts being produced, comprising the steps of sensing said variable during a part production cycle of said machine to provide a control signal when the value of said variable is within a predetermined range, positioning a parts sorter mechanism responsive to said control signal in proximity to said machine to intercept parts produced by said machine, causing said parts sorter to respond to said signal to separate the parts produced by said machine when the value of said variable is within said range from the parts produced by said machine when the value of said variable is outside of said range, determining whether the value of said variable is above or below said range, and separating the parts produced when the value of said variable is above said range from the parts produced when the value of said variable is below said range.

2. A method according to claim 1 wherein said machine is an injection molding machine having a mold in which said parts are produced, said variable being the peak pressure in said mold during a parts production cycle.

3. A method of sorting acceptable parts from defective parts produced by a parts producing machine having at least one operating variable whose value is determinative of the acceptability of the parts being produced, comprising the steps of sensing said variable during a part production cycle of said machine to provide a control signal when the value of said variable is within a predetermined range, positioning a parts sorter mechanism responsive to said control signal in proximity to said machine to intercept parts produced by said machine, causing said parts sorter to respond to said signal to separate the parts produced by said machine when the value of said variable is within said range from the parts produced by said machine when the value of said variable is outside of said range, counting the number of machine cycles wherein the value of said variable is outside said range, and providing a second control signal if said number exceeds a predetermined number within a predetermined time interval.

4. A method according to claim 3 comprising the further step of providing said second control signal if the number of machine cycles wherein the value of said variable is outside said range exceeds a predetermined number during a predetermined number of machine cycles.

5. A method of sorting acceptable parts from defective parts produced by a parts producing machine having at least one operating variable whose value is determinative of the acceptability of the parts being produced, comprising the steps of sensing said variable during a part production cycle of said machine to provide a control signal when the value of said variable is within a predetermined range, positioning a parts sorter mechanism responsive to said control signal in proximity to said machine to intercept parts produced by said machine, causing said parts sorter to respond to said signal to separate the parts produced by said machine when the value of said variable is within said range from the parts produced by said machine when the value of said variable is outside of said range, storing said control signal after said sensing step, and delaying the operation of said parts sorter mechanism until said parts production cycle is completed.

6. Sorting apparatus for use with a parts production machine, comprising in combination a conveyor disposed to receive parts produced by said machine, reversible drive means for driving said conveyor in one direction or the other, means responsive to an operating variable of said machine for causing said drive means to drive said conveyor in one direction when the value of said variable is within a predetermined range and to drive said conveyor in the other direction when the value of said variable is outside said range.

7. In combination with a plastic part molding machine sorting apparatus as set forth in claim 6 disposed in proximity to said machine for intercepting plastic parts ejected from said machine.

8. The combination set forth in claim 7 wherein said operating variable is the peak pressure within the mold in which the plastic parts are molded.

* * * * *